No. 827,267. PATENTED JULY 31, 1906.
C. SCHMIDT.
ADJUSTING AND FASTENING RING.
APPLICATION FILED OCT. 29, 1903.

Witnesses:
Harold Kind
M. B. Hayes.

Inventor:
Carl Schmidt,
By Knight Bros
Attorneys.

UNITED STATES PATENT OFFICE.

CARL SCHMIDT, OF TEGEL, GERMANY.

ADJUSTING AND FASTENING RING.

No. 827,267.  Specification of Letters Patent.  Patented July 31, 1906.

Application filed October 29, 1903. Serial No. 179,050.

*To all whom it may concern:*

Be it known that I, CARL SCHMIDT, engineer, a subject of the King of Prussia, German Emperor, residing at 2 Schöneberger street, Tegel, Germany, have invented a certain new and useful Adjusting and Fastening Ring, of which the following is a full, clear, and exact description.

The present invention relates to a setting and fastening device in the construction of which use is made of the well-known action which two rings eccentrically turned one within the other exert upon a shaft passing through them.

The invention is especially designed for shaft-couplings and belt-pulley fastenings.

The ring, coupling, or the belt-pulley fastening possesses no projecting parts, such as screws or wedges. It is therefore safer against accident, does not damage the shaft, and renders the mounting exceptionally easy.

Figure 2:
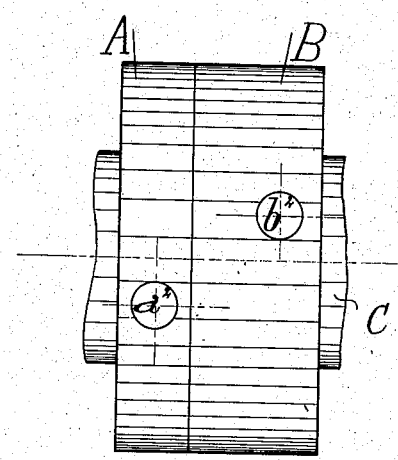
Figure 1:
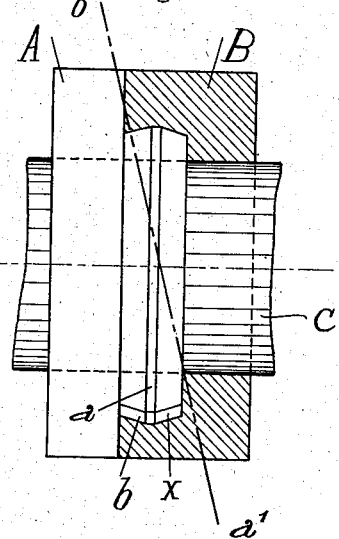
Figure 3:
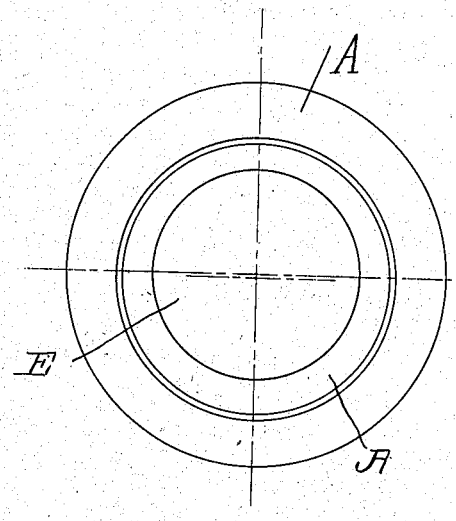
Figure 4:
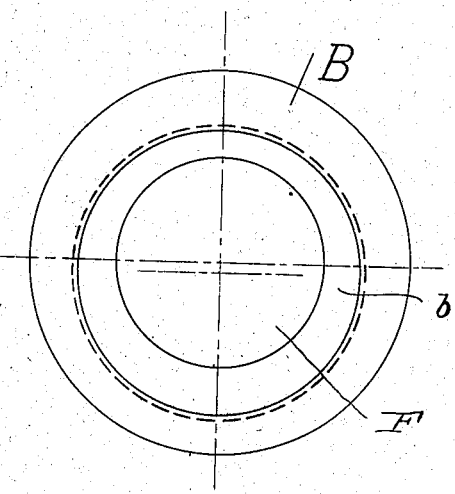

Referring to the accompanying drawings, Figure 1 shows an elevation and partial section through the fastening or setting device in the locked position. Fig. 2 shows an elevation of the same. Fig. 3 shows a view of the ring A. Fig. 4 shows the cap B.

The setting and fastening ring A, provided with a central concentric bore E, is to be fixed upon the shaft C with the help of the cap B, which also has concentric bore F. For this object the concentric ring A is provided with an eccentric projection $a$, cut or beveled in both directions, as shown, and the concentric cap B is provided with a correspondingly-formed eccentric groove $b$, as shown in Figs. 1 and 4. The diameter of the eccentric groove $b$ in the cap B must be somewhat greater than the diameter of the eccentric projecting part $a$ of the ring A, so that the cap B can be moved longitudinally over the shaft and can pass with the edges of its groove $b$ over the projecting part $a$ of the ring A. When the two parts are brought together longitudinally into the proper position, they are turned relatively to one another around the shaft, and in consequence of the eccentricity of the projecting part $a$ and of the groove $b$ the two parts are then pressed tightly upon the shaft. Now in order that the ring A in its function as setting and fastening ring may not be pressed cornerwise upon the shaft the cap B must come so far over the projection $a$ of ring A and the width of the projecting part $a$ and the depth of the groove $b$ must be such that the pressure forcing the ring A upon the shaft is exerted within the cylindrical internal surface of said ring. For this object the cap B is made to press the ring A upon the shaft at such an angle that the line of pressure $a'$ $b'$ falls entirely within the internal bore of the ring A, as is indicated in Fig. 1. The locking of the ring A under the force thus exerted at right angles to the shaft is further secured, in that the beveled eccentric surfaces of the groove $b$ and of the projection $a$ combine the ring and cap into a solid whole upon the shaft. It must be further mentioned that the form of the two eccentric surfaces need not necessarily be the beveled or tapering one shown; but the shape of the eccentric surfaces of $a$ $b$ must be such that the eccentric part of the cap B engages over the eccentric part of the locking-ring A and by means of its gripping-surface is forced strongly against the other part in order to insure the correct locking of the whole device upon the shaft.

As before stated, the eccentric groove $b$ has a greater diameter than the eccentric projecting part $a$ in order that the cap B can be pushed against the ring A. Consequently a space X is left when the rings are turned relatively one to another. The turning of the two parts A B for fastening the same upon the shaft or freeing the same therefrom can be effected in the simplest manner by inserting studs or hooks in the holes $a^2$ $b^2$ and turning the parts relatively to one another by pulling the studs or hooks in a circumferential direction around the shaft. This is especially useful in cases where there is no free space at the sides of the fastening device.

Having thus described my invention, the following is what I claim as new therein and desire to secure by Letters Patent:

In a fastening and setting device, the combination with a cap having a concentric bore and an eccentric cavity forming an enlargement of the bore, of a ring provided with a concentric bore and an eccentric annular prolongation surrounding the bore and adapted for insertion into said cavity; said cavity and said prolongation being tapering toward both sides from the center.

The foregoing specification signed at Berlin this 10th day of October, 1903.

CARL SCHMIDT.

In presence of—
WOLDEMAR HAUPT,
HENRY HASPER.